UNITED STATES PATENT OFFICE.

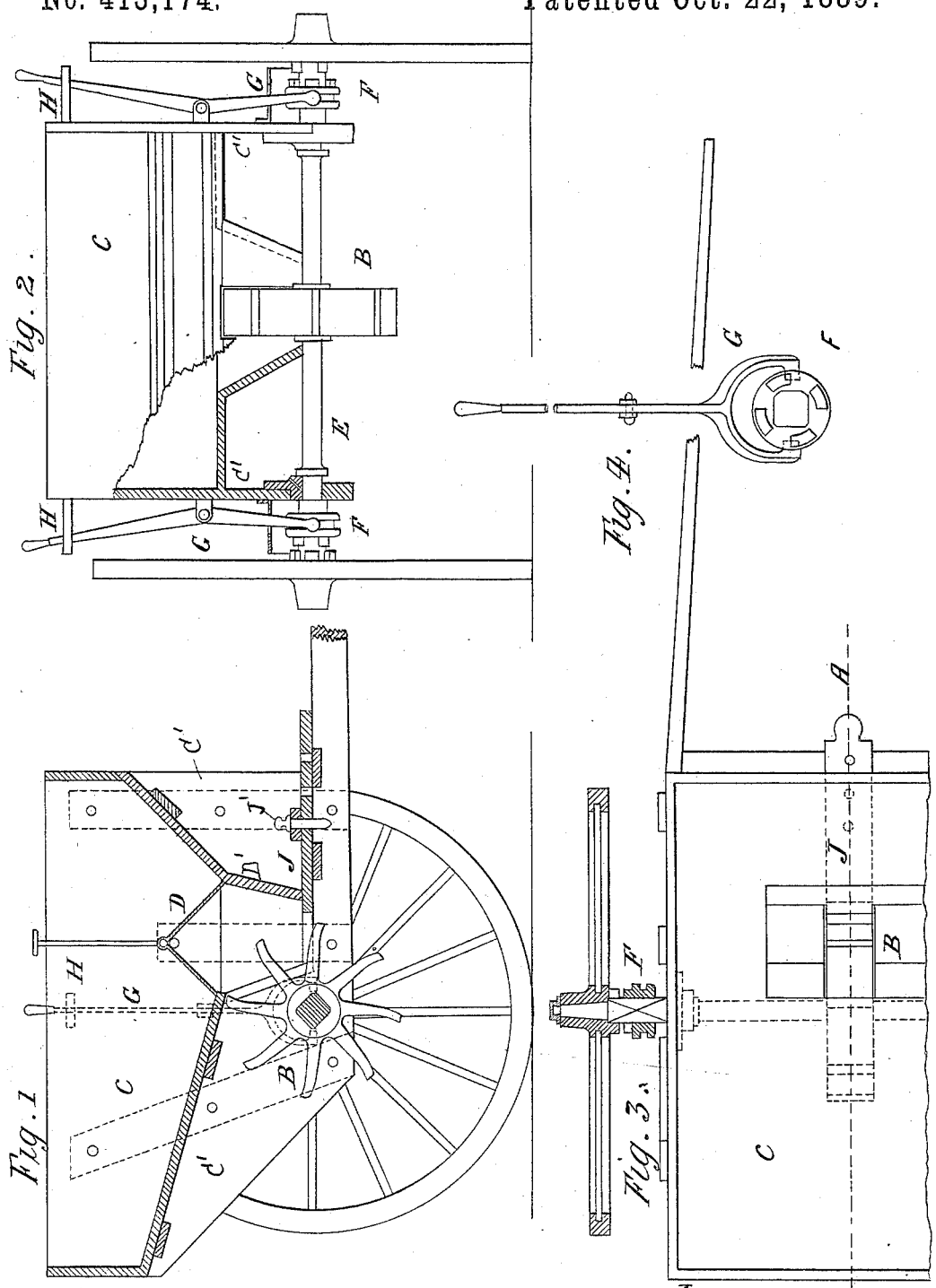

RUFUS ALEXANDER CONNELL, OF WHIGHAM, GEORGIA.

MANURE-DISTRIBUTER.

SPECIFICATION forming part of Letters Patent No. 413,174, dated October 22, 1889.

Application filed May 17, 1889. Serial No. 311,180. (No model.)

*To all whom it may concern:*

Be it known that I, RUFUS ALEXANDER CONNELL, a citizen of the United States, residing at Whigham, in the county of Decatur and State of Georgia, have invented certain new and useful Improvements in Fertilizer Pulverizers and Distributers, of which the following is a specification.

The object of my invention is to provide a simple, strong, durable, and efficient apparatus for pulverizing manure and similar fertilizer and distributing it upon the ground.

My improved apparatus consists of a hopper-shaped body mounted on wheels and provided with an opening at the bottom, through which the fertilizer is fed. A toothed wheel, mounted on the main axle and made to revolve therewith by suitable clutch mechanism, works in the opening in the bottom of the hopper and pulverizes and distributes the fertilizer. A cover having inclined sides covers the opening in the hopper when the apparatus is not in operation, and the opening may also be closed by a horizontally-moving slide.

The details of construction and the subject-matter claimed will be hereinafter more fully set forth.

In the accompanying drawings, Figure 1 is a longitudinal central section of my improved apparatus with some of the parts in elevation. Fig. 2 is a transverse section with some of the parts in elevation. Fig. 3 is a detail view partly in plan and partly in section; and Fig. 4 is a detail view of the clutch-operating mechanism.

The main body or receptacle C is preferably formed, as shown in Fig. 1, with vertical sides and oppositely-inclined bottom pieces. The delivery-opening in the bottom of the receptacle or hopper is closed by a cover D, which is movable vertically by means of a handle, as shown, and its sides are tapered, so that when moved vertically to uncover the opening the cover may readily work its way through the fertilizer.

The axle E has suitable journals in the main frame of the vehicle, and the wheels are loose on the axle, but may be made rigid therewith by means of clutches, which are operated by hand-levers G, the upper ends or handles of which may engage with suitable sector-plates H, of any ordinary construction. The axle E carries a toothed wheel B below the hopper C, but projecting into the opening in the bottom of the hopper. The axle and main body of the wheel are below the bottom of the hopper, but the outer ends of the teeth project into the opening in rear of the front board D'. The teeth of the wheel B are slightly curved forwardly, as shown in Fig. 1, and are wide and flat, as shown in Fig. 2, as I find that this form of teeth acts most efficiently. The slide J may be adjusted below the front board D' and held in any desired position by a bolt J'.

As will be seen, the sides C' of the vehicle project below the bottom of the hopper on each side at front and rear.

Any suitable clutch mechanism for connecting the wheels to the axle may be employed; but I prefer that shown in the drawings, in which a clutch F is shown as sliding on a square portion of the axle to connect and disconnect the wheels therefrom.

I claim as of my own invention—

1. The combination, substantially as hereinbefore set forth, of the hopper having an opening at the bottom, the axle below the opening in the hopper, the supporting-wheels, the toothed distributing-wheel below the hopper, but extending into the opening in the hopper, and the vertically-removable cover D.

2. The combination, substantially as hereinbefore set forth, of the hopper having an opening in the bottom with the vertically-removable cover D, having inclined sides, for the purpose specified, the wheel B, having flat forwardly-projecting teeth extending into the opening of the hopper, and the axle on which the wheel is carried, and on each end of which is a supporting-wheel.

3. The combination, substantially as hereinbefore set forth, of the hopper having oppositely-inclined bottom pieces, the vertically-removable cover having inclined sides, the toothed wheel below the opening in the hopper, the axle to which it is secured, the supporting-wheels loosely mounted on the ends of the axle, and clutch mechanism for rigidly securing the supporting-wheels to the axle.

4. The combination, substantially as hereinbefore set forth, of the hopper having oppositely-inclined bottom pieces, the vertically-removable cover for the opening in the bottom of the hopper, the front piece D', the horizontally-moving slide J below the front piece, the supporting-wheels, the axle, and the toothed wheel secured to the axle and projecting into the opening in the hopper in rear of the front piece D'.

RUFUS ALEXANDER CONNELL.

Witnesses:
L. B. WILSON,
J. AVRIELL.